United States Patent
Kwak et al.

(10) Patent No.: US 7,209,456 B2
(45) Date of Patent: Apr. 24, 2007

(54) METHOD FOR DETERMINING POWER OFFSET OF HS-PDSCH IN AN ASYNCHRONOUS CDMA MOBILE COMMUNICATION SYSTEM AND SIGNALING METHOD THEREFOR

(75) Inventors: Yong-Jun Kwak, Yongin-shi (KR); Sung-Ho Choi, Songnam-shi (KR); Ju-Ho Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 879 days.

(21) Appl. No.: 10/436,720

(22) Filed: May 12, 2003

(65) Prior Publication Data

US 2004/0001472 A1    Jan. 1, 2004

(30) Foreign Application Priority Data

May 11, 2002   (KR)   ............... 10-2002-0026055

(51) Int. Cl.
*H04B 7/185*   (2006.01)
(52) U.S. Cl. ............ 370/318; 370/331; 370/332; 370/333; 370/334; 455/436; 455/437; 455/438; 455/439; 455/442; 455/443; 455/444; 455/448; 455/522
(58) Field of Classification Search ............... 455/436, 455/437, 438, 439, 442–444, 448, 522; 370/331, 370/332, 333, 334, 318
See application file for complete search history.

(56) References Cited

U.S. PATENT DOCUMENTS

| | | | |
|---|---|---|---|
| 6,473,624 B1 * | 10/2002 | Corbett et al. | 455/522 |
| 6,567,670 B1 * | 5/2003 | Petersson | 455/522 |
| 6,628,958 B1 * | 9/2003 | Kamel et al. | 455/522 |
| 6,708,041 B1 * | 3/2004 | Butovitsch et al. | 455/522 |
| 6,810,253 B2 * | 10/2004 | Lee et al. | 455/436 |
| 6,823,193 B1 * | 11/2004 | Persson et al. | 455/522 |
| 7,127,267 B2 * | 10/2006 | McGowan et al. | 455/522 |
| 2003/0147370 A1 * | 8/2003 | Wu | 370/338 |
| 2003/0232622 A1 * | 12/2003 | Seo et al. | 455/437 |

OTHER PUBLICATIONS

European Search Report dated Oct. 23, 2003 issued in a counterpart application, namely, Appln. No. 03010614.0.
ETSI TS 125 423 v4.4.0 (2002-03) Universal Mobile Telecommunications System (UMTS); UTRAN Iur Interface RNSAP Signalling (3GPP TS 25.423 version 4.4.0 Release 4).
ETSI TS 125 433 v5.0.0 (2002-03) Universal Mobile Telecommunications System (UMTS); UTRAN Iub Interface NBAP Signalling (3 GPP TS 25.433 version 5.0.0 Release 5).
Universal Mobile Telecommunications System (UMTS); Physical Layer Procedures (FDD) (3GPP TS 25.214 version 3.4.0 Release 1999), Sep. 2000, pp. 1-48.
ETSI TS 125 331 v5.0.0 (2002-03) Universal Mobile Telecommunications System (UMTS); Radio Resource Control (RRC) protocol specification (3GPP TS 25.331 version 5.0.0 Release 5).

* cited by examiner

*Primary Examiner*—Steve M. D'Agosta
(74) *Attorney, Agent, or Firm*—The Farrell Law Firm

(57) ABSTRACT

In an asynchronous CDMA mobile communication system supporting HSDPA (High Speed Downlink Packet Access), in order to assign power to a high speed physical downlink shared channel (HS-PDSCH), a power offset is determined and then provided to a Node B and a user equipment (UE). For this, an HS-PDSCH power offset is determined by a controlling radio network controller (CRNC) and a Node B, and then transmitted to the UE or the Node B.

20 Claims, 10 Drawing Sheets

METHOD FOR DETERMINING POWER OFFSET OF HS-PDSCH IN AN ASYNCHRONOUS CDMA MOBILE COMMUNICATION SYSTEM AND SIGNALING METHOD THEREFOR

PRIORITY

This application claims priority under 35 U.S.C. § 119 to an application entitled "Method for Determining Power Offset of HS-PDSCH in an Asynchronous CDMA Mobile Communication System and Signaling Method Therefor" filed in the Korean Intellectual Property Office on May 11, 2002 and assigned Serial No. 2002-26055, the contents of which are incorporated herein by reference.

BACKGROUND OF THE INVENTION

1. Field of the Invention

The present invention relates generally to a downlink packet communication method in a code division multiple access (hereinafter referred to as "CDMA") mobile communication system employing high speed downlink packet access (hereinafter referred to as "HSDPA"), and in particular, to a method for assigning power of a high speed physical downlink shared channel (hereinafter referred to as "HS-PDSCH").

2. Description of the Related Art

The mobile communication system has evolved from an early circuit-based mobile communication system, chiefly supporting a voice service, into a high-speed, high-quality packet-based mobile communication system supporting a data service and a multimedia service. A $3^{rd}$ generation mobile communication system is divided into an asynchronous 3GPP ($3^{rd}$ Generation Partnership Project) system and a synchronous 3GPP2 ($3^{rd}$ Generation Partnership Project 2) system, and standardization for the $3^{rd}$ generation mobile communication system is currently being conducted for a high-speed, high-quality radio packet data service. For example, standardization for HSDPA is being conducted in 3GPP, while standardization for 1xEV-DV (Evolution-Data and Voice) is being carried out in 3GPP2. The standardization is being performed to find a solution for providing a high-speed, high-quality radio packet data service of 2 Mbps or higher in a $3^{rd}$ generation mobile communication system. A $4^{th}$ generation mobile communication system is attempting to provide a high-speed, high-quality multimedia service of a much higher data rate.

FIG. 1 schematically illustrates a cell provided in an asynchronous CDMA mobile communication system. Referring to FIG. 1, a Node B 101 communicates with user equipments (UEs) 104, 106, and 108 over downlink and uplink channels set up therebetween. Downlink physical channels used in HSDPA are divided into a dedicated physical channel, which is exclusively used by one UE and common channels, such as a common pilot channel (CPICH), a primary common control channel (P-CCCH), a secondary common control channel (S-CCCH), a high speed physical downlink shared channel (HS-PDSCH), and a high speed shared control channel (HS-SCCH).

The Node B 101 transmits the above-stated downlink physical channels. In FIG. 1, reference numerals 103, 105, 107, and 109 represent the downlink physical channels with arrows according to their types. Of the reference numerals, reference numeral 103 represents common channels, such as a common pilot channel, a primary common control channel, a secondary common control channel, and other indication channels. The Node B 101 assigns power so that signals on the common channels can arrive at up to a boundary of the cell, and then transmits the common channel signals to the UEs 104, 106, and 108 at the assigned power. This is because all UEs exiting in the cell should be able to receive the common channels. The common channels to which power was assigned the by the Node B is scarcely changed with the passage of time.

Reference numerals 105 and 107 represent dedicated physical channels among the downlink physical channels. An arrow shown by the reference numeral 105 represents a dedicated physical channel for communication with the UE 104, while an arrow shown by reference numeral 107 represents a dedicated physical channel for communication with the UE 106. The dedicated physical channel is assigned optimum power so that only the UE in communication can receive the dedicated physical channel. Therefore, as illustrated in FIG. 1, the UE 106 located at a relatively farther distance from the Node B 101 as compared with the UE 104 should be assigned higher power for its dedicated physical channel. The dedicated physical channels continuously undergo power control. As the dedicated physical channels are simply created or released, transmission power assigned to the dedicated physical channels are changed with the passage of time.

The UE 108 represents a UE receiving an HSDPA service. In FIG. 1, reference numeral 109 denotes a high speed physical downlink shared channel or a high speed shared control channel. The UE 108 receives the high speed physical downlink shared channel or high speed shared control channel 109. Even in the high speed physical downlink shared channel, as the number of UEs or a required service may undergo a change with the passage of time, transmission power assigned thereto is changed.

For these reasons, Node B 101 assigns the total power for a dedicated physical channel and HSDPA within the range of remaining power minus the power assigned to the common channel from the total available transmission power. The assigned total HSDPA power is determined by a controlling RNC (Radio Network Controller, hereinafter referred to as "CRNC") according to circumstances. The CRNC changes the total HSDPA power according to a change in conditions. The CRNC can inform a Node B of the time-varying total HSDPA power through a Physical Shared Channel Reconfiguration Request message, i.e., an NBAP (Node B Application Part) message. The NBAP message represents the total HSDPA power with an information element (hereinafter referred to as "IE") called "HS-PDSCH and HS-SCCH Total Power."

FIG. 2 is a graph illustrating a time-varying ratio of a total transmission power used by the Node B 101. In FIG. 2, a horizontal axis shown by reference numeral 201 indicates a change in time, and a vertical axis shown by reference numeral 202 indicates power assigned to channels in a Node B. A value shown by reference numeral 207 indicates the total transmission power available for the Node B. Reference numeral 203 indicates power assigned to a common pilot channel, and reference numeral 204 indicates power assigned to other common channels such as a primary common control channel and a secondary common control channel. Commonly, the power 203 and the power 204 are scarcely changed with the passage of time. However, a power assignment ratio for the common channels shown by the reference numerals 203 and 204 can undergo a change according to a characteristic of a cell. That is, a ratio of power 203 and 204 assigned to the common channel to the total Node B power 207 can be changed according to a radius of the cell or a geographical environment.

However, Node B power minus the power assigned to the common channel must be assigned for a dedicated physical channel and an HSDPA service. In FIG. 2, reference numeral 205 denotes power assigned to a dedicated physical channel, while reference numeral 206 indicates power assigned for an HSDPA service. The power 205 assigned to the dedicated physical channel is non-periodically changed according to a condition of the Node B, as shown by reference numerals 210, 211, and 212.

FIGS. 3 and 4 illustrate structures of an uplink channel and a downlink channel used for an HSDPA service, respectively. Specifically, FIG. 3 illustrates a structure of a high speed dedicated physical control channel (hereinafter referred to as "HS-DPCCH"), i.e., an uplink channel used for an HSDPA service.

Referring to FIG. 3, an HS-DPCCH includes a plurality of subframes 301. Assuming that one radio frame 302 with a length of 10 ms is comprised of 5 subframes, each subframe has a length of 2 ms. One subframe is comprised of 3 time slots. Of the 3 time slots, a first time slot 303 is assigned for transmission of an ACK/NAK signal for HARQ (Hybrid Automatic Repeat reQuest), and the other 2 time slots 304 are assigned for a channel quality indicator (hereinafter referred to as "CQI").

The CQI is determined by a UE, and used to indicate quality of the HS-PDSCH. The UE measures a signal-to-interference ratio (hereinafter referred to as "SIR") of a CPICH, and determines the CQI by estimating an SIR of the HS-PDSCH depending on a ratio of reception power of the CPICH to reception power of the HS-PDSCH. Therefore, the UE must previously have information on the SIR of the CPICH and a ratio of reception power of the CPICH to reception power of the HS-PDSCH, in order to determine the CQI. The SIR of the CPICH can be measured in the UE. The ratio of reception power of the CPICH to reception power of the HS-PDSCH is identical to a ratio of transmission power of the CPICH to transmission power of the HS-PDSCH. Herein, the ratio of reception power of the CPICH to reception power of the HS-PDSCH or the ratio of transmission power of the CPICH to transmission power of the HS-PDSCH will be referred to as an "HS-PDSCH power offset." For convenience, the term "CPICH power" used herein indicates either transmission power of CPICH or reception power of CPICH, and the term "HS-PDSCH power" indicates either transmission power of HS-PDSCH or reception power of HS-PDSCH. However, it should be noted that when the CPICH power is construed as transmission power of the CPICH, the HS-PDSCH power should also be interpreted as transmission power of HS-PDSCH. The CPICH power has a different value according to a characteristic of a cell. In addition, as shown by reference numeral 206 of FIG. 2, power assigned for HSDPA is also changed with the passage of time. Therefore, the HS-PDSCH power offset is also not a fixed value, but a value changeable according to the type of a cell, timing condition, and power of a common channel.

FIG. 4 illustrates a structure of a downlink channel used for an HSDPA service. In FIG. 4, reference numeral 410 represents a structure of HS-SCCH, and reference numeral 420 represents a structure of HS-PDSCH. In the HS-SCCH 410 and the HS-PDSCH 420, a subframe has a length of 2 ms, and is comprised of 3 time slots. In the HS-PDSCH, transmission of a subframe is started at a time when transmission of a third time slot in the HS-SCCH is started.

As described in conjunction with FIGS. 3 and 4, a UE transmits CQI measured by a CPICH to a Node B over an HS-PDSCH. At this moment, as the CQI is determined by the CPICH, CQI and HS-PDSCH power offset to be applied to HS-PDSCH may be generated. In order to solve this problem, it is necessary to newly define a correct CQI by reflecting an HS-PDSCH power offset in the CQI determined by the CPICH. In addition, the Node B and the UE must previously have information on the HS-PDSCH power offset.

Therefore, it is necessary to newly define a scheme for determining the HS-PDSCH power offset and signal processing procedures for sharing the HS-PDSCH power offset in a mobile communication system.

SUMMARY OF THE INVENTION

It is, therefore, an object of the present invention to provide a method for accurately determining power assigned to a high speed physical downlink shared channel in a Node B and a UE, in order to increase performance of a mobile communication system.

It is another object of the present invention to provide a method for determining power assigned to each of high speed physical downlink shared channels in a mobile communication system.

It is further another object of the present invention to provide a method for determining a power offset assigned to each of high speed physical downlink shared channels in a mobile communication system.

It is yet another object of the present invention to provide a method for signaling a power offset of a high speed physical downlink shared channel between a Node B, an RNC, and a UE.

It is still another object of the present invention to provide a method for compensating channel quality measured by a common pilot channel based on a power offset, and using the compensated power offset as a channel quality indicator for a high speed physical downlink shared channel.

It is still another object of the present invention to provide a method for determining by a DRNC (Drift RNC) a power offset considering a difference between transmission power of a common pilot channel and transmission power of a high speed physical downlink shared channel.

It is still another object of the present invention to provide a method for determining by a Node B a power offset considering a difference between transmission power of a common pilot channel and transmission power of a high speed physical downlink shared channel.

It is still another object of the present invention to provide a signaling method for transmitting a power offset determined by a DRNC to a Node B and a UE.

It is still another object of the present invention to provide a signaling method for transmitting a power offset determined by a Node B to a UE.

In accordance with a first aspect of the present invention, there is provided a method for transmitting predetermined power offset information on a high speed physical downlink shared channel in a drift radio network controller (DRNC) to achieve excellent channel performance indication between a user equipment (UE) existing within a cell and a Node B, in a system including the Node B, the DRNC connected to the Node B, for managing resource information for communication with UEs existing within the cell occupied by the Node B, and a serving radio network controller (SRNC) connected to the DRNC, for transmitting a control message to the UEs. The method comprises sending a radio link setup request from the SRNC to the DRNC, transmitting a radio link setup request message with the power offset information from the DRNC to the Node B; transmitting a radio link setup response message with the power offset information from the DRNC to the SRNC; and transmitting the power offset information from the SRNC to the UE.

In accordance with a second aspect of the present invention, there is provided a method for transmitting predetermined power offset information on a high speed physical downlink shared channel in a drift radio network controller (DRNC) to achieve excellent channel performance indication between a user equipment (UE) existing in a cell and a Node B, in a system including the Node B, the DRNC connected to the Node B, for managing resource information for communication with UEs existing within the cell occupied by the Node B, and a serving radio network controller (SRNC) connected to the DRNC, for transmitting a control message to the UEs. The method comprises sending a radio link reconfiguration prepare request from the SRNC to the DRNC; transmitting a radio link reconfiguration prepare message with the power offset information, from the DRNC to the Node B; transmitting a radio link reconfiguration ready message with the power offset information, from the DRNC to the SRNC; and transmitting a radio bearer reconfiguration request message with the power offset information, from the SRNC to the UE.

In accordance with a third aspect of the present invention, there is provided a method for transmitting power offset information on a high speed physical downlink shared channel in a Node B to achieve excellent channel performance indication between a user equipment (UE) existing in a cell and the Node B, in a system including the Node B, a drift radio network controller (DRNC) connected to the Node B, for managing resource information for communication with UEs existing within the cell occupied by the Node B, and a serving radio network controller (SRNC) connected to the DRNC, for transmitting a control message to the UEs. The method comprises sending a radio link setup request from the SRNC to the DRNC; transmitting a physical shared channel reconfiguration request message with the total power assigned for an HSDPA (High Speed Downlink Packet Access) service, from the DRNC to the Node B; transmitting a response message for the physical shared channel reconfiguration request message, from the Node B to the DRNC; transmitting a radio link setup request message with HSDPA service-related information, from the DRNC to the Node B; determining, by the Node B, the power offset information considering the total power assigned for the HSDPA service, and transmitting a response message with the power offset information to the DRNC in response to the radio link setup request message; transmitting a radio link setup response message with the power offset information, from the DRNC to the SRNC; and transmitting the power offset information from the SRNC to the UE.

In accordance with a fourth aspect of the present invention, there is provided a method for transmitting power offset information on a high speed physical downlink shared channel in a Node B to achieve excellent channel performance indication between a user equipment (UE) existing in a cell and the Node B, in a system including the Node B, a drift radio network controller (DRNC) connected to the Node B, for managing resource information for communication with UEs existing within the cell occupied by the Node B, and a serving radio network controller (SRNC) connected to the DRNC, for transmitting a control message to the UEs. The method comprises sending a radio link reconfiguration prepare message from the SRNC to the DRNC; transmitting a physical shared channel reconfiguration request message with the total power assigned for an HSDPA (High Speed Downlink Packet Access) service, from the DRNC to the Node B; transmitting a response message for the physical shared channel reconfiguration request message, from the Node B to the DRNC; transmitting a radio link reconfiguration prepare message with HSDPA service-related information, from the DRNC to the Node B; determining, by the Node B, the power offset information considering the total power assigned for the HSDPA service, and transmitting a response message for the radio link reconfiguration prepare message along with the power offset information, to the DRNC; transmitting a radio link reconfiguration prepare message with the power offset information, from the DRNC to the SRNC; and transmitting a radio bearer reconfiguration request message with the power offset information, from the SRNC to the UE.

In accordance with a fifth aspect of the present invention, there is provided a method for transmitting power offset information on a high speed physical downlink shared channel in a drift radio network controller (DRNC) to achieve excellent channel performance indication between a user equipment (UE) existing in a cell and a Node B, in a system including the Node B, the DRNC connected to the Node B, for managing resource information for communication with UEs existing within the cell occupied by the Node B, and a serving radio network controller (SRNC) connected to the DRNC, for transmitting a control message to the UEs. The method comprises determining the power offset information considering a ratio of power assigned to a common pilot channel to power assigned to the high speed physical downlink shared channel; transmitting an NBAP (Node B Application Part) message with the power offset information to the Node B; and transmitting an RNSAP (Radio Network System Application Part) message with the power offset information to the SRNC; wherein the SRNC transmits an RRC (Radio Resource Control) message with the power offset information to the UE.

In accordance with a sixth aspect of the present invention, there is provided a method for transmitting power offset information on a high speed physical downlink shared channel in a Node B to achieve excellent channel performance indication between a user equipment (UE) existing in a cell and the Node B, in a system including the Node B, a drift radio network controller (DRNC) connected to the Node B, for managing resource information for communication with UEs existing within the cell occupied by the Node B, and a serving radio network controller (SRNC) connected to the DRNC, for transmitting a control message to the UEs. The method comprises receiving information on the total power assigned for an HSDPA (High Speed Downlink Packet Access) service from the DRNC through an NBAP (Node B Application Part) message; determining the power offset information considering a ratio of power assigned to the high speed physical downlink shared channel, determined based on the information on the total power assigned for the HSDPA service, to power assigned to a common pilot channel; and transmitting an NBAP message with the power offset information to the DRNC; wherein the DRNC transmits an RNSAP (Radio Network System Application Part) message with the power offset information to the SRNC, and the SRNC transmits an RRC (Radio Resource Control) message with the power offset information to the UE.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
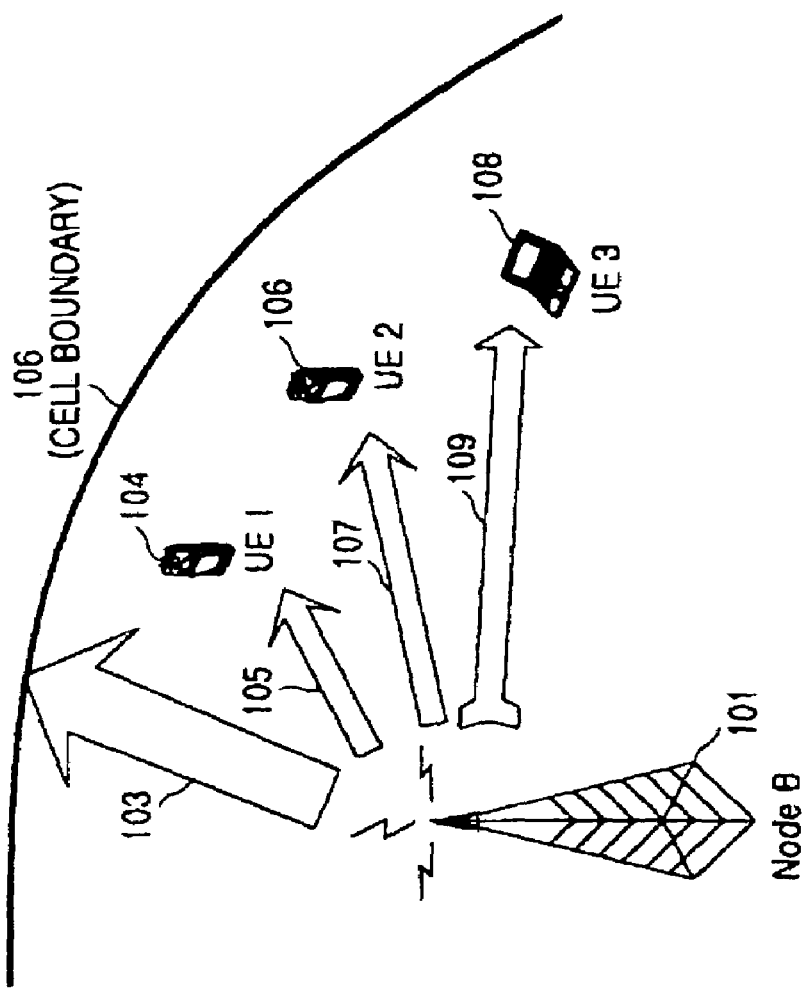
FIG. 1 illustrates channels used within a cell of a conventional mobile communication system.
Figure 2:
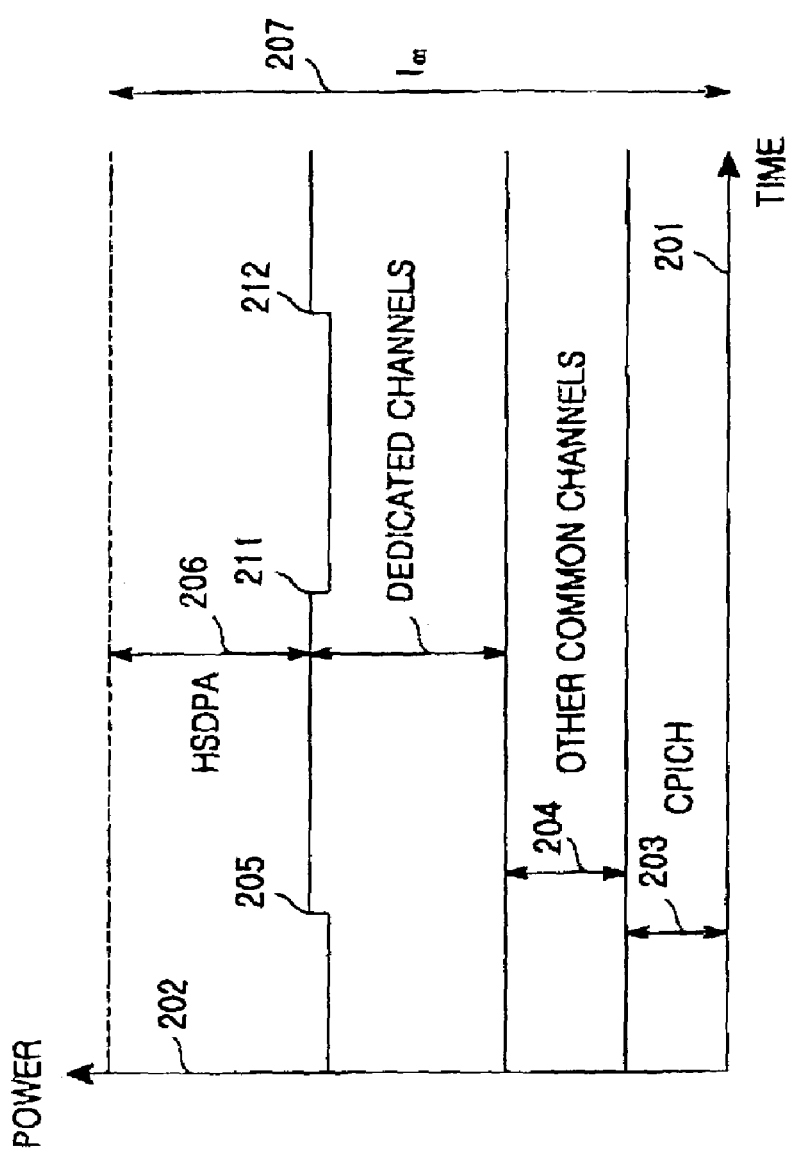
FIG. 2 illustrates Node B power assigned to respective channels within a cell of a conventional mobile communication system.
Figure 3:
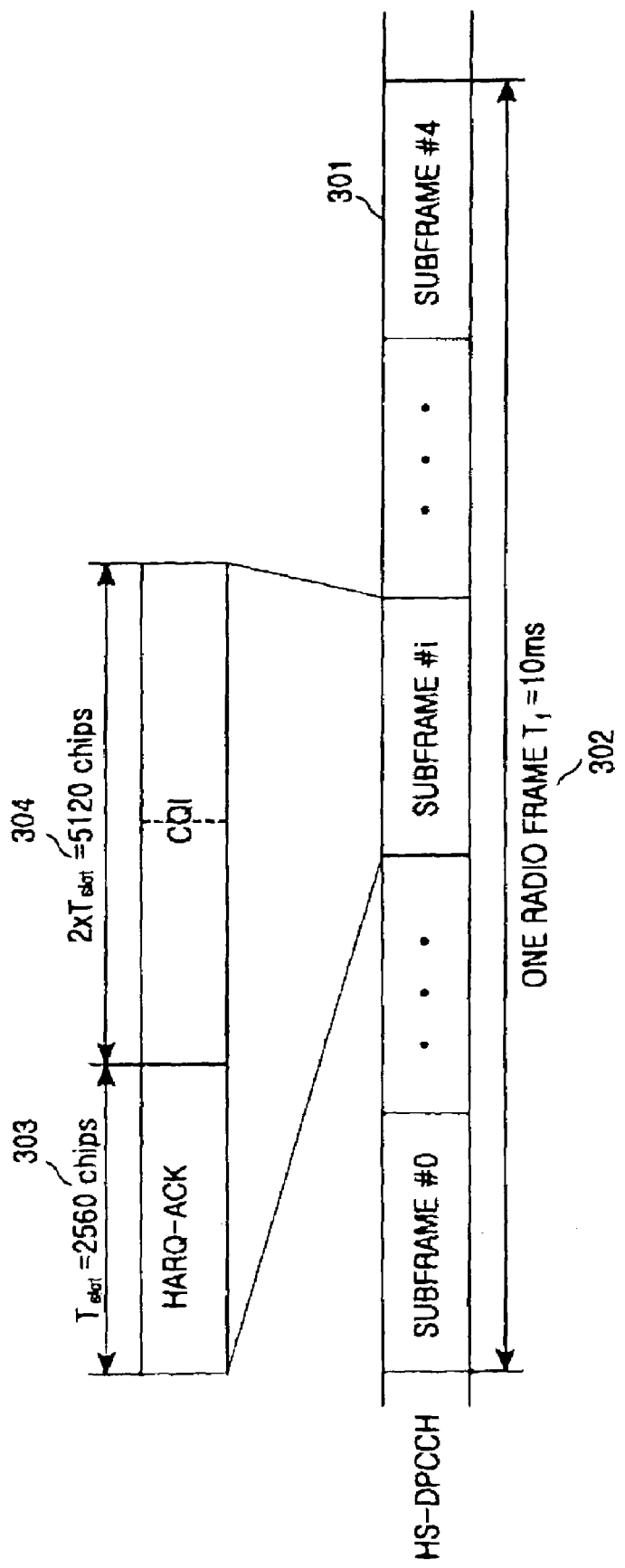
FIG. 3 illustrates a structure of an uplink channel supporting HSDPA in a conventional mobile communication system.
Figure 4:
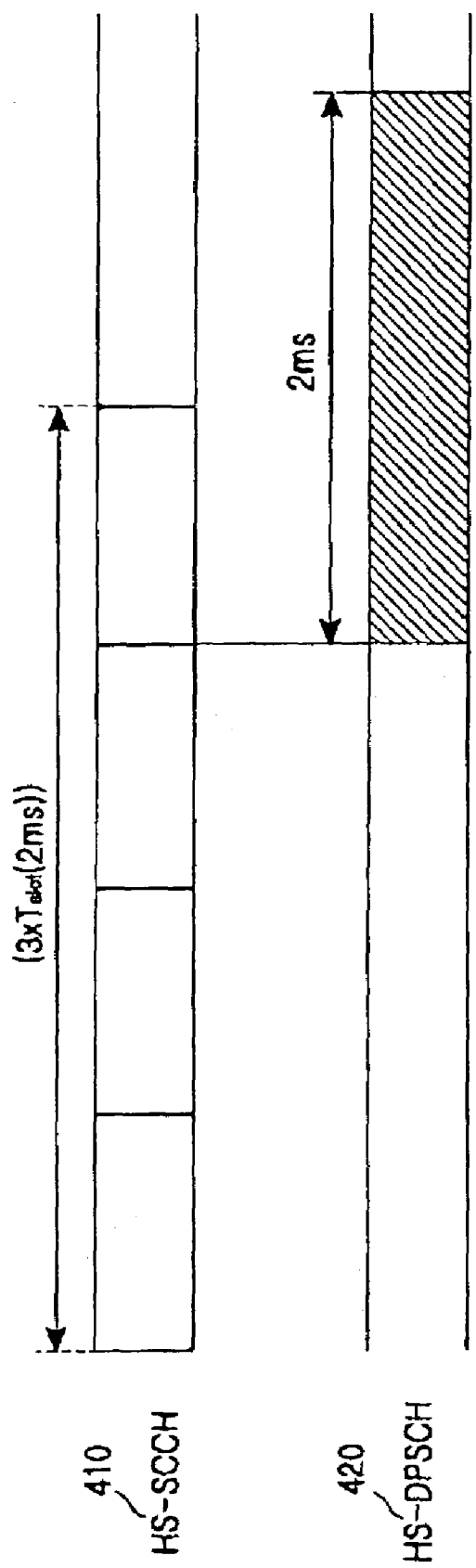
FIG. 4 illustrates a structure of downlink channels supporting HSDPA in a conventional mobile communication system.

Several preferred embodiments of the present invention will now be described in detail hereinbelow with reference to the annexed drawings. In the drawings, the same or similar elements are denoted by the same reference numerals even though they are depicted in different drawings. In the following description, a detailed description of known functions and configurations incorporated herein has been omitted for conciseness.

In the following description, the present invention will provide a method for determining an HS-PDSCH power offset for an HSDPA service and a method for enabling a Node B and a UE to share the determined HS-PDSCH power offset through signal processing.

1. First Embodiment

In a first embodiment of the present invention, an HS-PDSCH power offset is determined by a CRNC that controls a Node B that transmits the HS-PDSCH. A description will be made of a method for transmitting by the CRNC the HS-PDSCH power offset to a Node B through an NBAP message, and delivering the HS-PDSCH power offset to a UE through an RNSAP (Radio Network System Application Part) or RRC (Radio Resource Control) message.

As described in conjunction with the prior art (FIGS. 1–4), the CRNC determines power to be assigned to an HSDPA service within the range of the total power available in the Node B. That is, the CRNC determines the total transmission power that HS-SCCH and HS-PDSCH can use, and then keeps the information. The present invention aims at determining the HS-PDSCH power offset using power to be assigned to the HSDPA service, i.e., the maximum transmission power of HS-SCCH and HS-PDSCH, possessed by the CRNC. In this embodiment, an HS-PDSCH power offset determined by the CRNC is defined as a function of maximum transmission power information of an HS-SCCH and an HS-PDSCH, already determined by the CRNC. That is, the HS-PDSCH power offset is set based on information possessed by the CRNC, such as the maximum transmission power value of HS-SCCH and HS-PDSCH, CPICH transmission power in the Node B, and the total number of HS-PDSCH codes used by the Node B.

Figure 5:
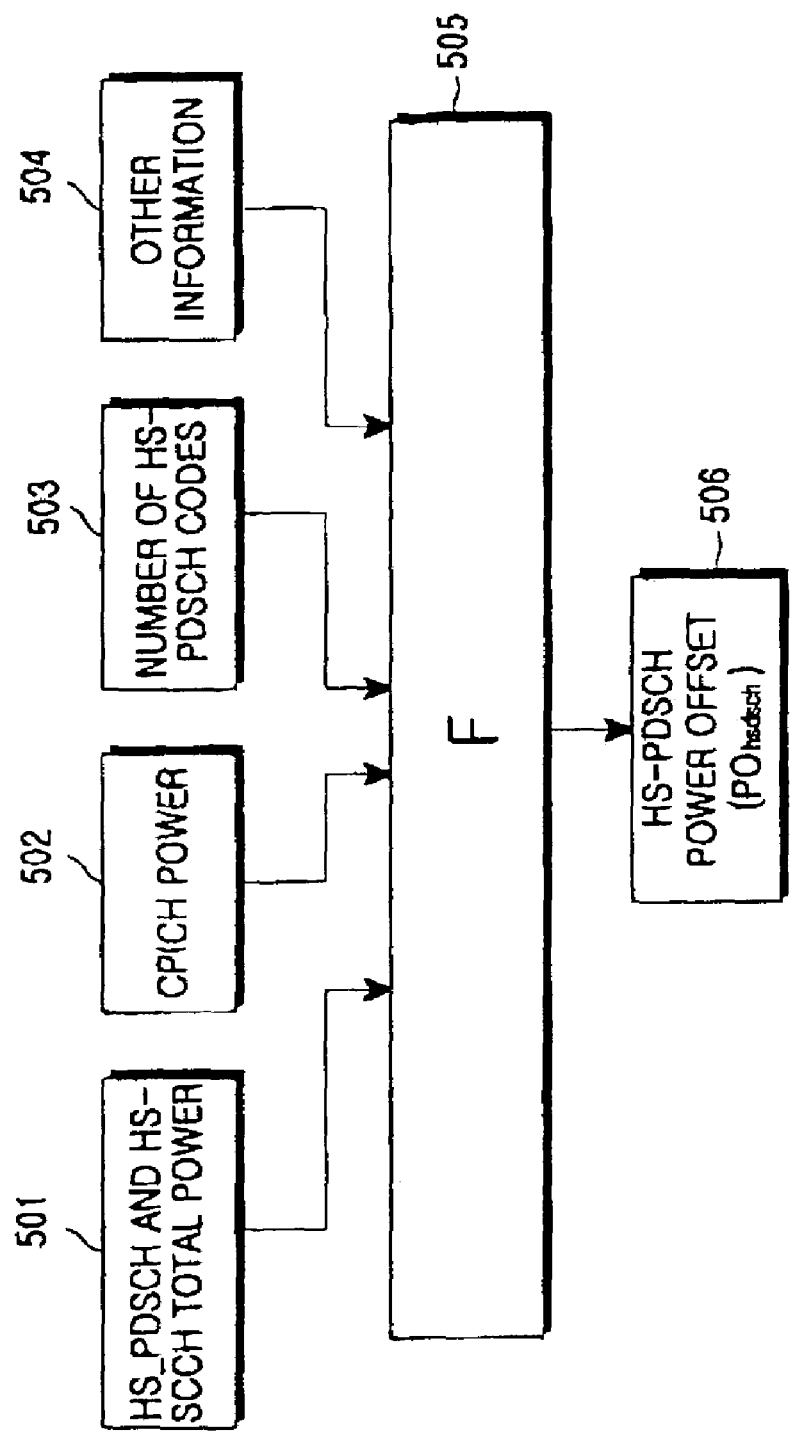
FIG. 5 illustrates a process of determining an HS-PDSCH power offset by a CRNC according to an embodiment of the present invention.

FIG. 5 illustrates a block for determining an HS-PDSCH power offset according to an embodiment of the present invention. Referring to FIG. 5, reference numerals 501, 502, 503, and 504 each represent parameters for determining the HS-PDSCH power offset. The parameters are information possessed by the CRNC. The reference numeral 501 indicates information on the total power assigned for an HSDPA service in a Node B. The reference numeral 502 denotes power information of CPICH transmitted from the Node B. The reference numeral 503 indicates a total number of codes used for HS-PDSCH, and the reference numeral 504 represents information possessed by the other CRNCs. Based on the parameters, an HS-PDSCH power offset 506 can be obtained through a particular function 505. For example, the HS-PDSCH power offset can be determined by Equation (1).

$$\text{Power}_{hsdsch} = (\text{Max HSDPA Total power} - \text{Max HS-SCCH power} - \text{margin})/N \quad \text{PO}_{hsdsch} = 10 \log_{10}(\text{Power}_{hsdsch}/\text{Power}_{cpich}) \quad \text{Equation (1)}$$

In Equation (1), $\text{Power}_{hsdsch}$ indicates power per HS-PDSCH code, and Max HSDPA Total power indicates the maximum total transmission power assigned for an HSDPA service. Further, Max HS-SCCH power indicates the maximum transmission power assigned to HS-SCCH, and N denotes the total number of codes used for HS-PDSCH. In addition, $\text{Power}_{cpich}$ represents transmission power assigned to CPICH, and $\text{PO}_{hsdsch}$ represents an HS-PDSCH power offset per code. That is, the $\text{PO}_{hsdsch}$ 506 is determined by choosing a function which is in proportion to the Max USDPA Total power information 501 and in inverse proportion to the $\text{Power}_{cpich}$ information 502 and the total number 503 of codes used for the HS-PDSCH.

In the embodiment, the HS-PDSCH reference power offset determination block described in conjunction with FIG. 5 is included in a CRNC.

The HS-PDSCH power offset information determined in the way stated above must be transmitted to a Node B and UE.

Figure 6:
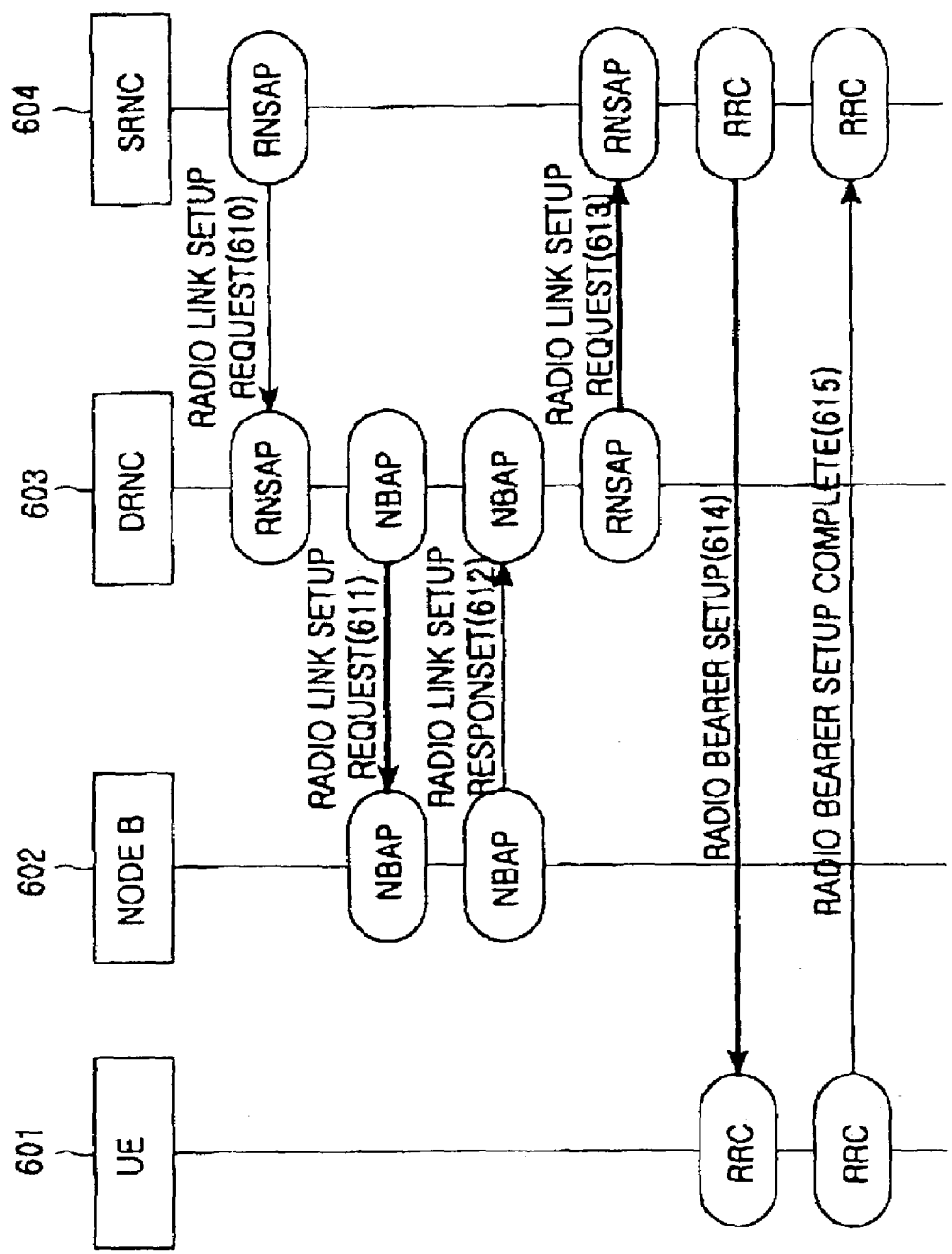
FIG. 6 illustrates an example of a signaling procedure for delivering HS-PDSCH power offset information in a mobile communication system according to an embodiment of the present invention.
Figure 7:
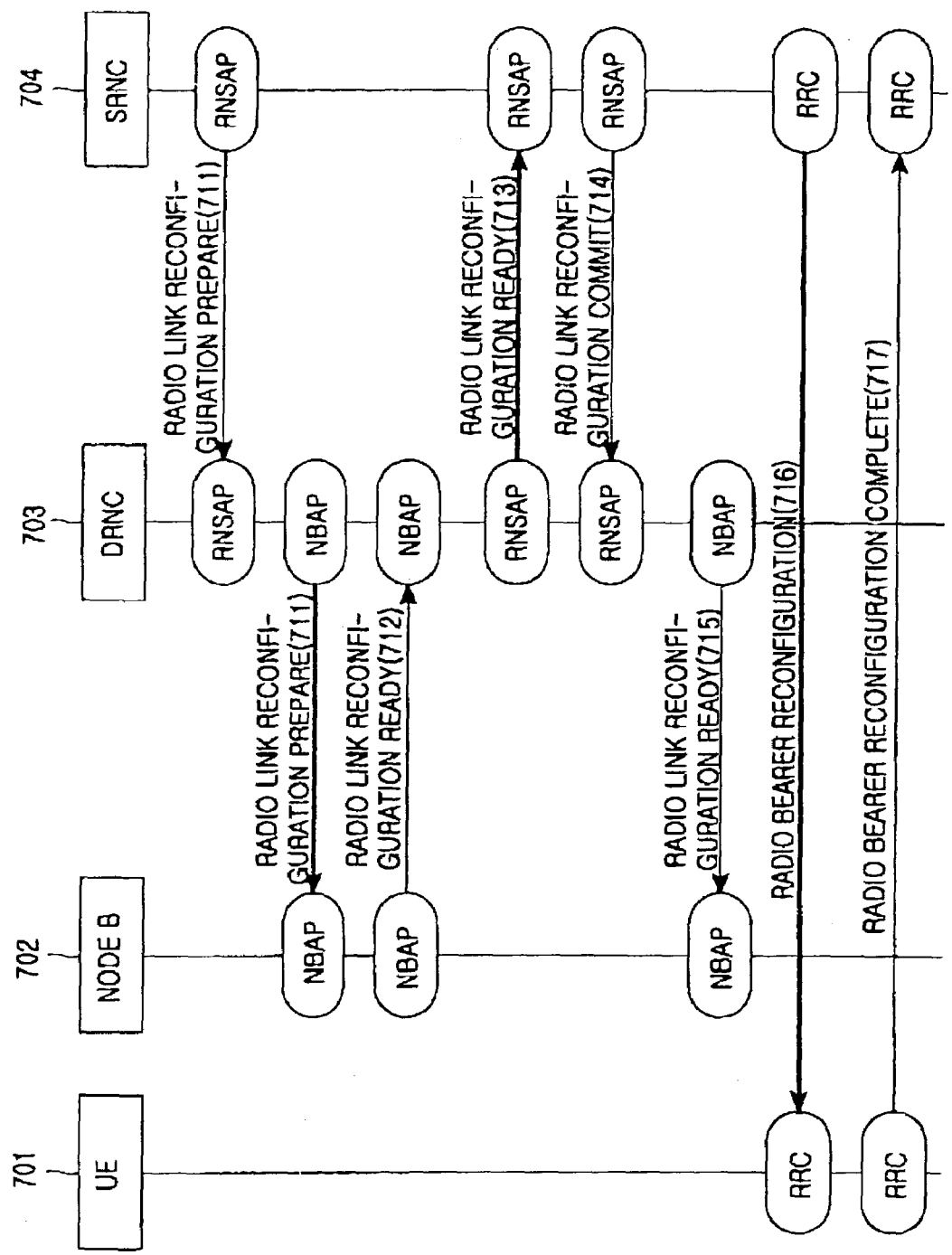
FIG. 7 illustrates another example of a signaling procedure for delivering HS-PDSCH power offset information in a mobile communication system according to an embodiment of the present invention.

FIGS. 6 and 7 illustrate procedures for delivering an HS-PDSCH power offset determined by the CRNC to a Node B and a UE. In the following description made with reference to FIGS. 6 and 7, an "RNSAP message" is used between RNCs, an "NBAP message" is used between a DRNC and a Node B, and an "RRC message" is used between the Node B and a UE.

FIG. 6 illustrates a signaling procedure for delivering HS-PDSCH power offset information in a mobile communication system according to an embodiment of the present invention. As illustrated in FIG. 6, a Node B 602 is connected to a DRNC 603 via an Iub, and the DRNC 603 is connected to an SRNC (Serving RNC) 604 via an Iur. In addition, the DRNC 603 serves as a CRNC of the Node B 602.

Referring to FIG. 6, the SRNC 604 sends a Radio Link Setup Request message 610 requesting setup of a radio link, to the DRNC 603. The Radio Link Setup Request message 610 includes HSDPA-related information to be exchanged between a UE 601 and the Node B 602. The HSDPA-related information includes HS-DSCH information and HS-PDSCH RL ID (Radio Link Identifier). Upon receiving the RNSAP message 610, the DRNC 603 (or a CRNC) acquires the HSDPA-related information by analyzing the RNSAP message 610. The DRNC 603 transmits the acquired HSDPA-related information and additional information possessed by the DRNC 603 to the Node B 602 through a Radio Link Setup Request message 611 requesting setup of a radio link. Information contained in the NBAP message 611 includes HS-DSCH information, HS-PDSCH RL ID, and HS-DSCH-RN. Through the NBAP message 611, the DRNC (or CRNC) 603 can send a determined HS-PDSCH power offset. If the HS-PDSCH power offset is defined as $PO_{hsdsch}$, a $PO_{hsdsch}$ IE can be included in an HS-DSCH Information IE. Table 1 below shows the HS-DSCH Information IE. The $PO_{hsdsch}$, an IE included in the last row, represents the HS-PDSCH power offset information. IE type and reference of the $PO_{hsdsch}$ IE is determined according to a possible value of HS-PDSCH power offset information. In this embodiment, it is assumed that a value of 3 to 15 is used for the IE type and reference of the $PO_{hsdsch}$ IE. Also, the $PO_{hsdsch}$ information is assumed to be power offset information of an HS-PDSCH using one code. Alternatively, the $PO_{hsdsch}$ information may be defined as a power offset of all HS-PDSCHs used by one Node B. In this case, the Node B must inform the UE of the number of codes used for the HS-PDSCHs.

TABLE 1

HS-DSCH FDD Information

| IE/Group Name | Presence | Range | IE type and reference | Semantics description | Criticality | Assigned Criticality |
|---|---|---|---|---|---|---|
| HS-DSCH MAC-d Flow Specific Information | | 1 . . . <Maxno ofMACdFlows> | | | — | |
| >HS-DSCH MAC-d Flow ID | M | | 9.2.1.31I | | — | |
| >BLER | M | | 9.2.1.4A | | — | |
| >Allocation/Retention Priority | M | | 9.2.1.1A | | — | |
| >Priority Queue Information | M | 1 . . . <Maxno ofPrioQueues> | | | — | |
| >>Priority Queue ID | M | | 9.2.1.49C | | — | |
| >>Scheduling Priority Indicator | M | | 9.2.1.53H | | — | |
| >>MAC-d PDU Size Index | | 1 . . . <Maxno ofMACdPDUindexes> | | | — | |
| >>>SID | M | | 9.2.1.53I | | — | |
| >>>MAC-d PDU Size | M | | 9.2.1.38A | | — | |
| UE Capabilities information | | 1 | | | — | |
| >Max TrCH Bits per HS-DSCH TTI | M | | ENUMERATED (7300, 14600, 20456, 28800, . . . ) | | — | |
| >HS-DSCH multi-code capability | M | | ENUMERATED (5, 10, 15, . . . ) | | — | |
| >Min Inter-TTI Interval | M | | INTEGER (1 . . . 3, . . . ) | | — | |
| >MAC-hs reordering buffer size | M | | INTEGER (1 . . . 300, . . . ) | Total combined receiving buffer capability in RLC and MAC-hs in kBytes | — | |
| HARQ memory partitioning | | 1 . . . <Maxno ofHARQprocesses> | | | — | |
| >Process memory size | M | | INTEGER (1 . . . 172800, . . . ) | | — | |
| Measurement feedback offset | M | | INTEGER (0 . . . 79, . . . ) | | — | |
| POhsdsch | M | | Integer(−3 . . . 15) | Default Power offset between HS- | — | |

TABLE 1-continued

HS-DSCH FDD Information

| IE/Group Name | Presence | Range | IE type and reference | Semantics description | Criticality | Assigned Criticality |
|---|---|---|---|---|---|---|
| | | | | PDSCH and P-CPICH/S-CPICH. In dB. | | |

As described above, the $PO_{hsdsch}$ information is transmitted to the Node B 602 through the Radio Link Setup Request message 611. Upon receiving the NBAP message 611, the Node B 602 sends a Radio Link Setup Response message 612 to the DRNC 603, acknowledging the receipt of the Radio Link Setup Request message 611. The DRNC 603 then transmits a Radio Link Setup Response message 613 to the SRNC 604, using the Radio Link Setup Request message 611 and information possessed by the DRNC 603. The RNSAP message 613 includes an HS-DSCH Information Response IE, and the HS-DSCH Information Response IE has the determined $PO_{hsdsch}$ information. Table 2 below shows detailed information of the HS-DSCH Information Response IE. In Table 2, $PO_{hsdsch}$ included in the HS-DSCH Information Response IE is the same information as $PO_{hsdsch}$ in the HS-DSCH Information IE included in the NBAP message 611.

Upon receiving the RNSAP message 613, the SRNC 604 generates a Radio Bearer Setup message 614 requesting setup of a radio bearer, using the RNSAP message 613 and other information, and then transmits the generated Radio Bearer Setup message 614 to the UE 601. The RRC message 614 also includes $PO_{hsdsch}$ information transmitted from the DRNC (or CRNC) 603 through the RNSAP message 613. The UE 601, as it receives the RRC message 614, can receive the $PO_{hsdsch}$ information determined by the DRNC 603.

Upon receiving the Radio Bearer Setup message 614, the UE 601 sends a Radio Bearer Setup Complete message 615 indicating completed setup of a radio bearer to the SRNC 604, thereby informing the SRNC 604 that it can receive an HSDPA service. As a result, the UE 601 and the Node B 602 share the HS-PDSCH power offset information. Therefore, an operation of determining CQI by a UE, and an operation

TABLE 2

HS-DSCH FDD Information Response

| IE/Group Name | Presence | Range | IE type and reference | Semantics description | Criticality | Assigned Criticality |
|---|---|---|---|---|---|---|
| HS-DSCH MAC-d Flow Specific Information Response | | 1 ... <maxnoofMACdFlows> | | | — | |
| >HS-DSCH MAC-d Flow ID | M | | 9.2.1.30O | | — | |
| >Binding ID | O | | 9.2.1.4 | | — | |
| >Transport Layer Address | O | | 9.2.1.63 | | — | |
| HS-SCCH Specific Information Response | | 1 ... <maxnoofHSSCCHcodes> | | | | |
| >Code Number | M | | INTEGER (0 ... 127) | | | |
| Measurement feedback reporting cycle k1 | M | | Measurement Feedback Reporting Cycle 9.2.2.24a | used by the UE when not in soft handover | | |
| Measurement feedback reporting cycle k2 | M | | Measurement Feedback Reporting Cycle 9.2.2.24a | used by the UE when in soft handover | | |
| POhsdsch | M | | Integer(-3 ... 15) | Default Power offset between HS-PDSCH and P-CPICH/S-CPICH. In dB. | — | | of receiving by a Node B the CQI and then transmitting HS-DSCH depending on the received CQI is effectively performed.

In the signaling procedure of FIG. 6, the messages represented by a bold arrow indicate the signals over which the $PO_{hsdsch}$ information is transmitted.

FIG. 7 illustrates another signaling procedure for delivering HS-PDSCH power offset information in a mobile included in HS-DSCH Information to modify IE. The HS-DSCH Information to Add IE is identical in structure to the HS-DSCH FDD Information IE included in the NBAP message 611, described in conjunction with FIG. 6. On the contrary, the HS-DSCH Information to modify IE is formed as illustrated in Table 3, and is identical in format of the $PO_{hsdsch}$ information included therein to the HS-DSCH FDD Information IE.

TABLE 3

HS-DSCH Information to modify

| IE/Group Name | Presence | Range | IE type and reference | Semantics description | Criticality | Assigned Criticality |
|---|---|---|---|---|---|---|
| HS-DSCH MAC-d Flow Specific Information | | 0 ... <Maxno ofMACdFlows> | | | — | |
| >HS-DSCH MAC-d Flow ID | M | | 9.2.131I | | — | |
| >BLER | O | | 9.2.1.4A | | — | |
| >Allocation/Retention Priority | O | | 9.2.1.1A | | — | |
| >Priority Queue Information | | 0 ... <Maxno ofPrioQueues> | | | — | |
| >>Priority Queue ID | M | | 9.2.1.49C | | — | |
| >>Scheduling Priority Indicator | O | | 9.2.1.53H | | — | |
| >>MAC-d PDU Size Index | | 0 ... <Maxno ofMACdPDUindexes> | | | — | |
| >>>SID | M | | 9.2.1.53I | | — | |
| >>>MAC-d PDU Size | O | | 9.2.1.38A | | — | |
| >Transport Bearer Request Indicator | M | | 9.2.1.62A | | — | |
| Measurement Reporting cycle | O | | ENUMERATED (k1, k2) | For FDD only | — | |
| POhsdsch | O | | Integer(-3 ... 15) | Default Power offset between HS-PDSCH and P-CPICH/S-CPICH. In dB. | | | communication system according to an embodiment of the present invention. That is, FIG. 7 illustrates a signaling procedure when a UE 701 initiates an HSDPA service during communication with a Node B 702 over a dedicated channel, or when the setup must be changed during the HSDPA service.

Referring to FIG. 7, an SRNC 704 transmits a Radio Link Reconfiguration Prepare message 710 requesting preparation for radio link reconfiguration, to a DRNC 703, thereby providing the DRNC 703 with information related to an HSDPA to be serviced. The DRNC 703 (or a CRNC in this embodiment) determines HS-PDSCH power offset information through the block described in conjunction with FIG. 5. Thereafter, the DRNC 703 generates a Radio Link Reconfiguration Prepare message 711 including information received through the RNSAP message 710 and other information, and transmits the generated Radio Link Reconfiguration Prepare message 711 to a Node B 702, thereby requesting reconfiguration of a radio link. The NBAP message 711 includes $PO_{hsdsch}$ information, the HS-PDSCH power offset information. The $PO_{hsdsch}$ information is included in HS-DSCH Information to Add IE, when an HSDPA service is added. However, when setup of an HSDPA service is modified, the $PO_{hsdsch}$ information is The Node B 702, receiving the NBAP message 711, acquires $PO_{hsdsch}$ information included in the received NBAP message 711, and sends a Radio Link Reconfiguration Ready message 712 indicating completed preparation for radio link reconfiguration to the DRNC 703. Upon receiving the NBAP message 712, the DRNC 703 transmits a Radio Link Reconfiguration Ready message 713 indicating completed preparation for radio link reconfiguration to the SRNC 704. The $PO_{hsdsch}$ information is transmitted through the RNSAP message 713. For an IE including the $PO_{hsdsch}$ information, an HS-DSCH FDD Information Response IE in the Radio Link Setup Response message of FIG. 6 is used. A detailed structure of the HS-DSCH FDD Information Response IE has been described with reference to FIG. 6.

Upon receiving the RNSAP message 713, the SRNC 704 sends a Radio Link Reconfiguration Commit message 714 committing reconfiguration of a radio link, to the DRNC 703. The DRNC 703 then sends a Radio Link Reconfiguration Commit message 715 committing reconfiguration of a radio link, to the Node B 702, thereby enabling the Node B 702 to perform a radio link reconfiguration process.

The SRNC 704 sends the $PO_{hsdsch}$ information to the UE 701 through a Radio Bearer Reconfiguration message 716 requesting reconfiguration of a radio bearer. Upon receiving the RRC message 716, the UE 701 reconfigures a radio bearer through a radio bearer reconfiguration procedure. If the radio bearer reconfiguration is completed, the UE 701 sends a Radio Bearer Reconfiguration Complete message 717 indicting completed reconfiguration of a radio bearer to the SNC 704, completing the signaling procedure of FIG. 7.

Also, in the signaling procedure described in conjunction with FIG. 7, messages represented by a bold arrow indicate the signals over which the $PO_{hsdsch}$ information is transmitted.

In this embodiment, in some cases, the $PO_{hsdsch}$ information, though not frequently, is subject to change. Each time a new UE desiring to receive a service is added to the Node B or a UE that was receiving a service is reset, the Node B updates the $PO_{hsdsch}$ information. If the $PO_{hsdsch}$ information is changed, the Node B can simply identify the changed $PO_{hsdsch}$ information. However, a process of providing the changed $PO_{hsdsch}$ information to the UEs that were previously receiving the HSDPA service from the Node B is additionally required. For this, there are two possible methods. In a first method, the UE may use the existing $PO_{hsdsch}$ information. In a second method, the Node B can provide the $PO_{hsdsch}$ information to all UEs currently in service through the message handling process of the radio link reconfiguration procedure described in conjunction with FIG. 7.

2. Second Embodiment

In a second embodiment of the present invention, it is assumed that the HS-PDSCH power offset is determined by a Node B that transmits the HS-PDSCH. The Node B determines an HS-PDSCH power offset, using HSDPA power information received from a CRNC through an NBAP message. A description will be made of a method in which the Node B re-transmits the HS-PDSCH power offset to an SRNC through an NBAP message and an RNSAP message, and the SRNC re-transmits the HS-PDSCH power offset to a UE through an RRC message.

Commonly, a CRNC determines the total power to be assigned for an HSDPA service within the range of the total power of a Node B. That is, the CRNC determines the maximum transmission power that HS-SCCH and HS-PDSCH can use, and then stores the information. The present invention is characterized in that the CRNC provides a Node B with information on the total power to be assigned for an HSDPA service, i.e., information on the maximum transmission power of HS-SCCH and HS-PDSCH, and the Node B then determines the HS-PDSCH power offset based on the total power information assigned for the HSDPA service. In this embodiment, an HS-PDSCH power offset is defined as a function of maximum transmission power information of HS-SCCH and HS-PDSCH, already determined by the CRNC. That is, the HS-PDSCH power offset is set based on information possessed by the CRNC, such as the maximum transmission power value of HS-SCCH and HS-PDSCH, received from the CRNC through an NBAP message, CPICH transmission power in the Node B, and the total number of HS-PDSCH codes used by the Node B.

Figure 8:
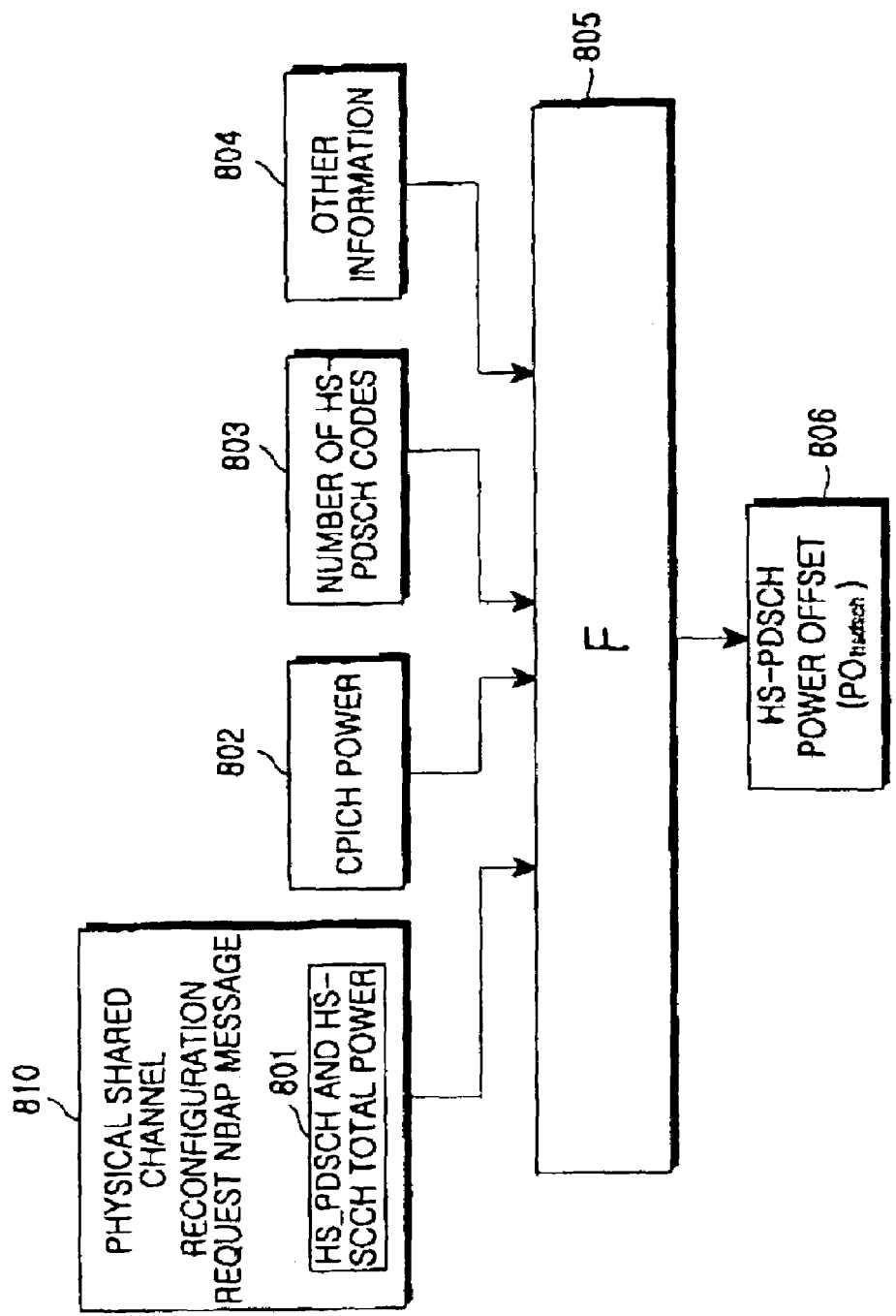
FIG. 8 illustrates a process of determining, by a Node B, an HS-PDSCH power offset in a mobile communication system according to another embodiment of the present invention.

FIG. 8 illustrates a process of determining, by a Node B, an HS-PDSCH power offset in a mobile communication system according to another embodiment of the present invention. Specifically, FIG. 8 is a block diagram for determining the HS-PDSCH power offset.

Referring to FIG. 8, reference numerals 801, 802, 803, and 804 each represent parameters for determining the HS-PDSCH power offset. The parameters are information possessed by the CRNC. Of the parameters, the maximum transmission power of HS-SCCH and HS-PDSCH, represented by the reference numeral 801, is information that the Node B received from a CRNC through a Physical Shared Channel Reconfiguration Request message 810. The other parameters represented by the reference numerals 802, 803 and 804 are information possessed by the Node B. The reference numeral 801 indicates information on the total power assigned for an HSDPA service in a Node B in service. The reference numeral 802 denotes power information of CPICH transmitted from the Node B. The reference numeral 803 indicates the total number of codes available for HS-PDSCH, and the reference numeral 804 represents information possessed by the other CRNCs. Based on the parameters, an HS-PDSCH power offset 806 can be calculated through a particular function 805. For example, the HS-PDSCH power offset can be determined by Equation (2).

$$\text{Power}_{hsdsch} = (\text{Max HSDPA Total power} - \text{Max HS-SCCH power} - \text{margin})/N \quad PO_{hsdsch} = 10 \log_{10} (\text{Power}_{hsdsch}/\text{Power}_{cpich}) \quad \text{Equation (2)}$$

In Equation (2), $\text{Power}_{hsdsch}$ indicates power per HS-PDSCH code, and Max HSDPA Total power indicates the maximum total transmission power assigned for an HSDPA service. Further, Max HS-SCCH power indicates the maximum transmission power assigned to HS-SCCH, and N denotes the total number of codes used for HS-PDSCH. In addition, $\text{Power}_{hsdsch}$ represents transmission power assigned to CPICH, and $PO_{hsdsch}$ represents an HS-PDSCH power offset per code. That is, the $PO_{hsdsch}$ 806 is determined by choosing a function in proportion to the Max HSDPA Total power information 801 and in inverse proportion to the $\text{Power}_{cpich}$ information 802 and a total number 803 of codes used for the HS-PDSCH.

In the second embodiment of the present invention, the HS-PDSCH reference power offset determination block described in conjunction with FIG. 8 is included in a Node B. In the process illustrated in FIG. 8, after determining an HS-PDSCH power offset, the Node B must transmit information on the HS-PDSCH power offset to a UE.

Figure 9:
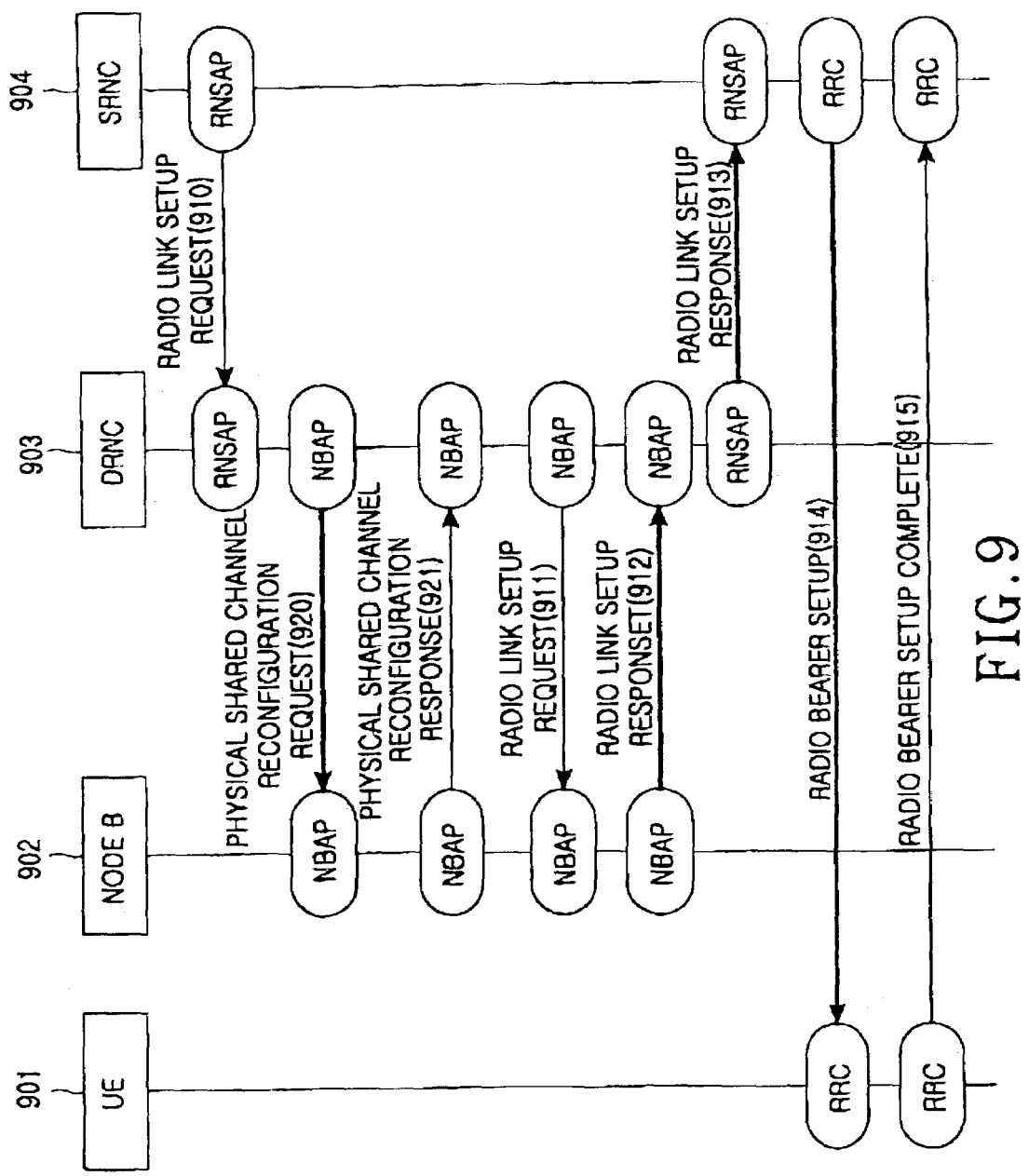
FIG. 9 illustrates an example of a signaling procedure for delivering HS-PDSCH power offset information in a mobile communication system according to another embodiment of the present invention.
Figure 10:
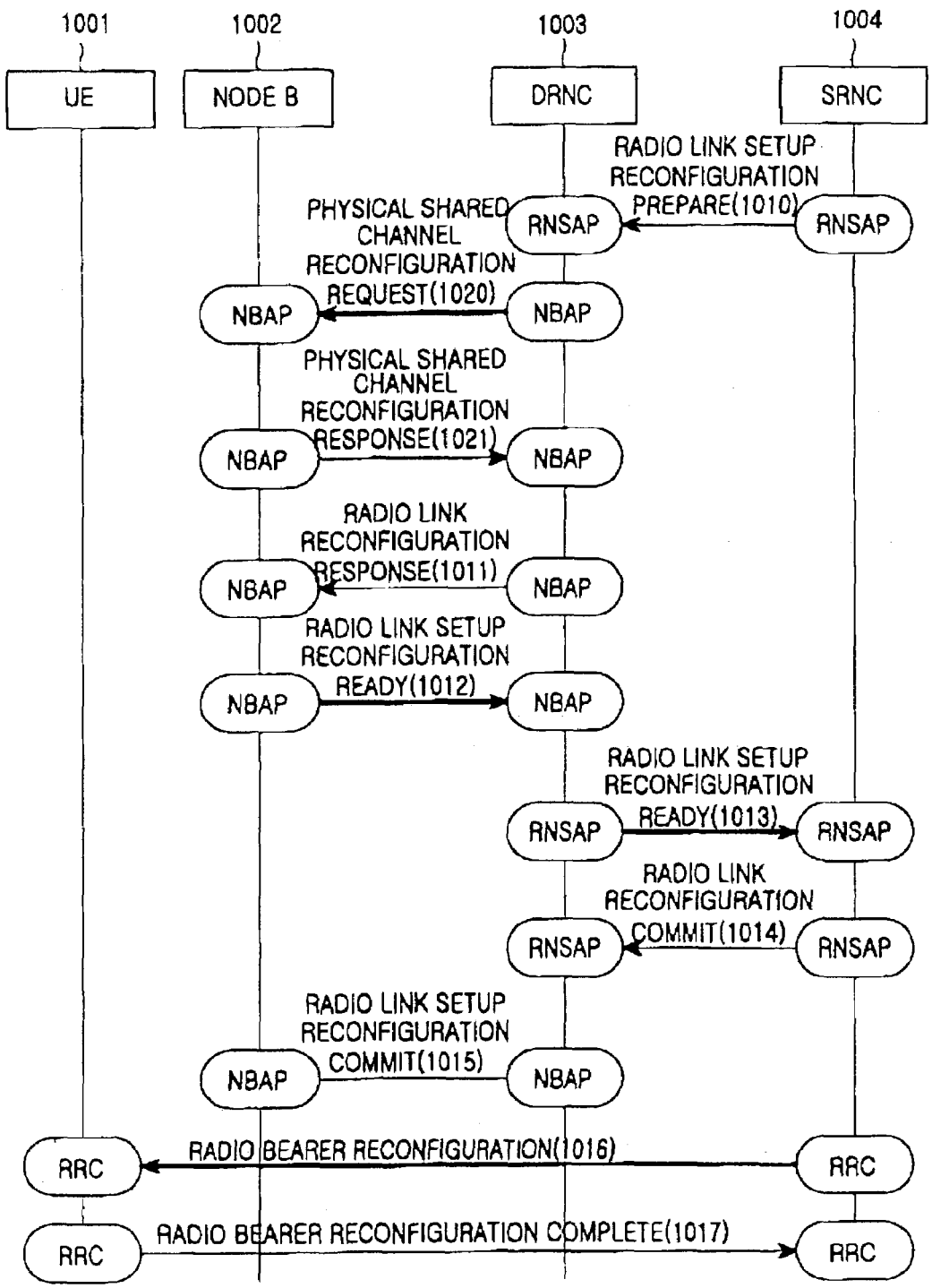
FIG. 10 illustrates another example of a signaling procedure for delivering HS-PDSCH power offset information in a mobile communication system according to another embodiment of the present invention.

FIGS. 9 and 10 illustrate examples of procedures for delivering an HS-PDSCH power offset determined by the Node B to a UE. In the following description made with reference to FIGS. 9 and 10, an "RNSAP message" is used between RNCs, an "NBAP message" is used between a DRNC and a Node B, and an "RRC message" is used between the Node B and a UE.

FIG. 9 illustrates an example of a signaling procedure for delivering HS-PDSCH power offset information in a mobile communication system according to another embodiment of the present invention. As illustrated in FIG. 9, a Node B 902 is connected to a DRNC 903 via an Iub, and the DRNC 903 is connected to an SRNC 904 via an Iur. In addition, the DRNC 903 serves as a CRNC of the Node B 902.

Referring to FIG. 9, the SRNC 904 sends a Radio Link Setup Request message 910 requesting setup of a radio link, to the DRNC 903. The Radio Link Setup Request message 910 includes an HSDPA-related IE, HS-DSCH-related information to be exchanged between a UE 901 and the Node B 902. The HSDPA-related information includes HS-DSCH information and HS-PDSCH RL ID. Upon receiving the RNSAP message 910, the DRNC 903 (or a CRNC) delivers maximum transmission power information of HS-SCCH and HS-PDSCH to the Node B 902 through a Physical Shared Channel Reconfiguration Request message 920 requesting reconfiguration of a physical shared channel. Upon receiving the NBAP message 920, the Node B 902 stores information included in the Physical Shared Channel Reconfiguration Request message 920, and then transmits a Physical Shared Channel Reconfiguration Response message 921 to the DRNC 903. The NBAP messages 920 and 921 can be transmitted after the SRNC 904 transmitted an RNSAP message of the Radio Link Setup Request message 910 to the DRNC 903, or can be exchanged on occasion between the DRNC 903 and the Node B 902 according to a condition of the DRNC 903.

The Physical Shared Channel Reconfiguration Request message 920 includes an HS-PDSCH and HS-SCCH Total Power IE, and the HS-PDSCH and HS-SCCH Total Power IE becomes the maximum transmission power information of HS-SCCH and HS-PDSCH described in conjunction with FIG. 8. That is, the Node B 902 has the maximum transmission power information of HS-SCCH and HS-PDSCH.

The DRNC 903, after receiving the RNSAP message 910, acquires HSDPA-related information by analyzing the RNSAP message 910, and then transmits the acquired information and additional information possessed by the DRNC 903 to the Node B 902 through a Radio Link Setup Request message 911 requesting setup of a radio link. An HSDPA-related IE included in the NBAP message 911 includes HS-DSCH Information, HS-PDSCH RL ID, and HS-DSCH-RN.

If the HSDPA-related information is delivered to the Node B 902 through the Radio Link Setup Request message 911, the Node B 902 generates HS-PDSCH power offset information. That is, since the Node B 902 has information on each of the reference numerals 801, 802, 803, and 804, it can generate the HS-PDSCH power offset information 806.

Thus, the Node B 902 starts an operation of delivering the generated HS-PDSCH power offset information to the UE 901.

Upon receiving the NBAP message 911, the Node B 902 sends a Radio Link Setup Response message 912 to the DRNC 903 in response to the NBAP message 911. The Node B 902 can transmit the determined HS-PDSCH power offset value along with the NBAP message 912. If the HS-PDSCH power offset is defined as $PO_{hsdsch}$, a $PO_{hsdsch}$ IE can be included in an HS-DSCH Information IE. Table 4 below shows an HS-DSCH Information IE included in the Radio Link Setup Response message 912. The $PO_{hsdsch}$, an IE included in the last row, represents the HS-PDSCH power offset information. IE type and reference of the $PO_{hsdsch}$ IE is determined according to a possible value of the HS-PDSCH power offset information. In this embodiment, it is assumed that a value of 3 to 15 is used for the IE type and reference of the $PO_{hsdsch}$ IE. Also, the $PO_{hsdsch}$ information is assumed to be power offset information of HS-PDSCH using one code. Alternatively, the $PO_{hsdsch}$ information can also be defined as a power offset of all HS-PDSCHs used by one Node B. In this case, the Node B must inform the UE of the number of codes used for the HS-PDSCHs.

TABLE 4

HS-DSCH FDD Information Response

| IE/Group Name | Presence | Range | IE type and reference | Semantics description | Criticality | Assigned Criticality |
|---|---|---|---|---|---|---|
| HS-DSCH MAC-d Flow Specific Information Response | | 1 . . . <Maxno ofMACdFlows> | | | — | |
| >HS-DSCH MAC-d Flow ID | M | | 9.2.1.31I | | — | |
| >Binding ID | O | | 9.2.1.4 | | — | |
| >Transport Layer Address | O | | 9.2.1.63 | | — | |
| HS-SCCH Code | | 1 . . . <Maxno ofHSSCCHcodes> | | | | |
| >Code Number | M | | INTEGER (0 . . . 127) | | | |
| Measurement feedback reporting cycle k1 | M | | Measurement Feedback Reporting Cycle 9.2.2.21B | employed by the UE when not in soft handover | — | |
| Measurement feedback reporting cycle k2 | M | | Measurement Feedback Reporting Cycle 9.2.2.21B | employed by the UE when in soft handover | — | |
| POhsdsch | M | | Integer(-3 . . . 15) | Default Power offset between HS-PDSCH and P-CPICH/S-CPICH. In dB. | — | |

The DRNC 903 sends a Radio Link Setup Response message 913 to the SRNC 904, using information included in the Radio, Link Setup Response message 912. Because the DRNC 903 has received the $PO_{hsdsch}$ information through the Radio Link Setup Response message 912, the RNSAP message 913 includes an HS-DSCH Information Response IE, so the DRNC 903 can transmit the $PO_{hsdsch}$ information to the SRNC 904 along with the HS-DSCH Information Response IE. Detailed information on the HS- DSCH Information Response IE is identical to the format described in conjunction with the first embodiment. The $PO_{hsdsch}$ included in the HS-DSCH Information Response IE is the same information as $PO_{hsdsch}$ in the HS-DSCH Information IE included in the NBAP message 911.

Upon receiving the RNSAP message 913, the SRNC 904 generates a Radio Bearer Setup message 914 requesting setup of a radio bearer, using the RNSAP message 913 and other information, and transmits the generated Radio Bearer Setup message 914 to the UE 901. The RRC message 914 also includes $PO_{hsdsch}$ information transmitted from the DRNC (or CRNC) 903 to the SRNC 904 through the RNSAP message 913. The UE 901, as it receives the RRC message 914, can receive the PO hsdsch information determined by the Node B 902.

Upon receiving the Radio Bearer Setup message 914, the UE 901 performs a procedure for setup of a radio bearer and then sends a Radio Bearer Setup Complete message 915 indicating completed setup of a radio bearer to the SRNC 904, thereby informing the SRNC 904 that it can receive an HSDPA service. As a result, the UE 901 and the Node B 902 share the HS-PDSCH power offset information. Therefore, an operation of determining CQI by a UE, and an operation of receiving by a Node B the CQI and then transmitting HS-DSCH depending on the received CQI can be smoothly performed.

In the signaling procedure of FIG. 9, the messages 912, 913, and 914 represented by a bold arrow are the signals transmitting the $PO_{hsdsch}$ information.

FIG. 10 illustrates another signaling procedure for delivering HS-PDSCH power offset information in a mobile communication system according to another embodiment of the present invention. That is, FIG. 10 illustrates a signaling procedure when a UE 1001 initiates an HSDPA service during communication with a Node B 1002 over a dedicated channel, or when the setup must be changed during the HSDPA service.

Referring to FIG. 10, an SRNC 1004 transmits a Radio Link Reconfiguration Prepare message 1010 requesting preparation for radio link reconfiguration, to a DRNC 1003, thereby providing the DRNC 1003 with information related to an HSDPA to be serviced. Upon receiving the RNSAP message 1010, the DRNC 1003 (or a CRNC) transmits maximum transmission power information of an HS-SCCH and an HS-PDSCH to a Node B 1002 through a Physical Shared Channel Reconfiguration Request message 1020 requesting reconfiguration of a physical shared channel. Upon receiving the NBAP message 1020, the Node B 1002 stores information included in the Physical Shared Channel Reconfiguration Request message 1020, and then transmits a Physical Shared Channel Reconfiguration Response message 1021 to the DRNC 1003. The NBAP messages 1020 and 1021 can be transmitted after the SRNC 1004 transmitted an RNSAP message of the Radio Link Reconfiguration Prepare message 1010 to the DRNC 1003, or can be exchanged on occasion between the DRNC 1003 and the Node B 1002 according to a condition of the DRNC 1003.

The Physical Shared Channel Reconfiguration Request message 1020 includes an HS-PDSCH and HS-SCCH Total Power IE, and the HS-PDSCH and HS-SCCH Total Power IE becomes the maximum transmission power information 801 of HS-SCCH and HS-PDSCH. That is, the Node B 1002 has the maximum transmission power information of HS-SCCH and HS-PDSCH.

The DRNC 1003 that received the Radio Link Reconfiguration Prepare message 1010, generates a Radio Link Reconfiguration Prepare message 1011 for preparation for reconfiguration of a radio link, using information received through the RNSAP message 1010 and other information, and then transmits the generated Radio Link Reconfiguration Prepare message 1011 to the Node B 1002. An HSDPA-related IE included in the NBAP message 1011 includes HS-DSCH Information, HS-PDSCH RL ID, and HS-DSCH-RN.

If the HSDPA-related information is delivered to the Node B 1002 through the Radio Link Reconfiguration Prepare message 1011, the Node B 1002 generates HS-PDSCH power offset information. That is, since the Node B 1002 has information on each of the reference numerals 801, 802, 803, and 804 of FIG. 8, it can generate the HS-PDSCH power offset information 806. Thus, the Node B 1002 starts an operation of delivering the generated HS-PDSCH power offset information to the UE 1001.

The Node B 1002, receiving the NBAP message 1011, acquires HSDPA-related information included in the received NBAP message 1011, and sends a Radio Link Reconfiguration Ready message 1012 indicating completed preparation for a radio link reconfiguration to the DRNC 1003, in response to the NBAP message 1011. The NBAP message 1012 is transmitted along with $PO_{hsdsch}$ information, HS-PDSCH power offset information determined by the Node B 1002. The $PO_{hsdsch}$ information is included in an HS-DSHC Information Response IE in the Radio Link Reconfiguration Ready message 1012 before being transmitted. The HS-DSHC Information Response IE is identical in structure to the IE described in conjunction with FIG. 9.

Upon receiving the NBAP message 1012, the DRNC 1003 stores $PO_{hsdsch}$ information included in the NBAP 1012. The DRNC 1003 transmits the stored $PO_{hsdsch}$ information to the SRNC 1004 through a Radio Link Reconfiguration Ready message 1013 indicating completed preparation for radio link reconfiguration. For an IE including the $PO_{hsdsch}$ information, an HS-DSCH FDD Information Response IE in the Radio Link Setup Response message illustrated in FIG. 6 is used. A detailed structure of the HS-DSCH FDD Information Response IE has been described with reference to FIG. 6.

Upon receiving the RNSAP message 1013, the SRNC 1004 sends a Radio Link Reconfiguration Commit message 1014 committing reconfiguration of a radio link, to the DRNC 1003. The DRNC 1003 then sends a Radio Link Reconfiguration Commit message 1015 to the Node B 1002, thereby enabling the Node B 1002 to perform a radio link reconfiguration process.

The SRNC 1004 sends the $PO_{hsdsch}$ information to the UE 1001 through a Radio Bearer Reconfiguration message 1016 requesting reconfiguration of a radio bearer. Upon receiving the RRC message 1016, the UE 1001 performs a procedure for reconfiguring a radio bearer. Thereafter, the UE 1001 sends a Radio Bearer Reconfiguration Complete message 1017 indicting completed reconfiguration of a radio bearer to the SNC 1004 in response to the RRC message 1016, completing the signaling procedure of FIG. 10.

Also, in the signaling procedure described in conjunction with FIG. 10, messages 1012, 1013, and 1016 represented by a bold arrow indicates the signals over which the $PO_{hsdsch}$ information is transmitted.

In this embodiment, in some cases, the $PO_{hsdsch}$ information, though not frequently, is subject to change. Each time a new UE desiring to receive a service is added to the Node B or the UE 1001 that was receiving a service is reset, the Node B 1002 updates the $PO_{hsdsch}$ information. If the $PO_{hsdsch}$ information is changed, the Node B 1002 can simply identify the changed $PO_{hsdsch}$ information. However, a process of providing the changed $PO_{hsdsch}$ information to the UEs 1001 that were previously receiving the HSDPA service from the Node B 1002 is additionally required. In this case, there are two possible methods. In a first method, the UE 1001 can use the existing $PO_{hsdsch}$ information. In a second method, the Node B 1002 can provide the $PO_{hsdsch}$ information to all UE 1001 currently in service through the message handling process of the radio link reconfiguration procedure described in conjunction with FIG. 10.

As described above, in an HSDPA system, a Node B determines power assigned to each HS-PDSCH, so that the Node B and a UE can accurately determine power to be assigned to an HS-PDSCH, contributing to an increase in entire performance of the HSDPA system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting predetermined power offset information on a high speed physical downlink shared channel in a drift radio network controller (DRNC) to achieve excellent channel performance indication between a user equipment (UE) located within a cell and a Node B, in a system including the Node B, the DRNC connected to the Node B for managing resource information for communication with UEs located within the cell occupied by the Node B, and a serving radio network controller (SRNC) connected to the DRNC for transmitting a control message to the UEs, the method comprising the steps of:

sending a radio link setup request from the SRNC to the DRNC;

transmitting a radio link setup request message including the predetermined power offset information from the DRNC to the Node B;

transmitting a radio link setup response message including the predetermined power offset information from the DRNC to the SRNC; and transmitting the predetermined power offset information from the SRNC to the UE.

2. The method of claim 1, wherein the radio link setup response message is transmitted after the predetermined power offset information is received from the Node B.

3. The method of claim 1, wherein the predetermined power offset information is determined considering a ratio of power assigned to a common pilot channel to power assigned to the high speed physical downlink shared channel.

4. The method of claim 3, wherein the predetermined power offset information $PO_{hsdsch}$ is determined by $$Power_{hsdsch}=(Max\ HSDPA\ Total\ power-Max\ HS\text{-}SCCH\ power-margin)/N\ PO_{hsdsch}=10\ \log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for an HSDPA (High Speed Downlink Packet Access) service, Max HS-SCCH power indicates power assigned to a high speed shared control channel (HS-SCCH), N indicates the total number of codes used for the HS-PDSCH, and $Power_{cpich}$ indicates power assigned to the common pilot channel (CPICH).

5. The method of claim 1, wherein the SRNC transmits the predetermined power offset information when a radio bearer to the UE is set up.

6. A method for transmitting predetermined power offset information on a high speed physical downlink shared channel in a drift radio network controller (DRNC) to achieve excellent channel performance indication between a user equipment (UE) located in a cell and a Node B in a system including the Node B, the DRNC connected to the Node B, for managing resource information for communication with UEs located within the cell occupied by the Node B, and a serving radio network controller (SRNC) connected to the DRNC for transmitting a control message to the UEs, the method comprising the steps of:

sending a radio link reconfiguration prepare request from the SRNC to the DRNC;

transmitting a radio link reconfiguration prepare message with the predetermined power offset information, from the DRNC to the Node B;

transmitting a radio link reconfiguration ready message with the predetermined power offset information, from the DRNC to the SRNC; and transmitting a radio bearer reconfiguration request message with the predetermined power offset information, from the SRNC to the UE.

7. The method of claim 6, wherein the radio link reconfiguration prepare message from the DRNC to the SRNC is transmitted after a radio link reconfiguration prepare message is received from the Node B.

8. The method of claim 6, further comprising the steps of:

upon receiving the radio link reconfiguration prepare message, transmitting, by the SRNC, a radio link reconfiguration commit message to the DRNC; and transmitting, by the DRNC, a radio link reconfiguration commit message to the Node B in response to the radio link reconfiguration commit message received from the SRNC.

9. The method of claim 6, wherein the predetermined power offset information is determined considering a ratio of power assigned to a common pilot channel to power assigned to the high speed physical downlink shared channel.

10. The method of claim 9, wherein the predetermined power offset information $PO_{hsdsch}$ is determined by $$Power_{hsdsch}=(Max\ HSDPA\ Total\ power-Max\ HS\text{-}SCCH\ power-margin)/N\ PO_{hsdsch}=10\log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for an HSDPA (High Speed Downlink Packet Access) service, Max HS-SCCH power indicates power assigned to a high speed shared control channel (HS-SCCH), N indicates a total number of codes used for the HS-PDSCH, and $Power_{cpich}$ indicates power assigned to the common pilot channel (CPICH).

11. A method for transmitting power offset information on a high speed physical downlink shared channel in a Node B to achieve excellent channel performance indication between a user equipment (UE) located in a cell and the Node B, in a system including the Node B a drift radio network controller (DRNC) connected to the Node B, for managing resource information for communication with UEs located within the cell occupied by the Node B, and a serving radio network controller (SRNC) connected to the DRNC for transmitting a control message to the UEs, the method comprising the steps of:
  sending a radio link setup request from the SRNC to the DRNC;
  transmitting a physical shared channel reconfiguration request message including a total power assigned for an HSDPA (High Speed Downlink Packet Access) service, from the DRNC to the Node B;
  transmitting a response message for the physical shared channel reconfiguration request message, from the Node B to the DRNC;
  transmitting a radio link setup request message including HSDPA service-related information, from the DRNC to the Node B;
  determining, by the Node B, the power offset information considering the total power assigned for the HSDPA service, and transmitting a response message including the power offset information to the DRNC in response to the radio link setup request message;
  transmitting a radio link setup response message including the power offset information, from the DRNC to the SRNC; and
  transmitting the power offset information from the SRNC to the UE.

12. The method of claim 11, wherein the power offset information $PO_{hsdsch}$ is determined by $$Power_{hsdsch} = (\text{Max HSDPA Total power} - \text{Max HS-SCCH power} - \text{margin})/N \quad PO_{hsdsch} = 10 \log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for the HSDPA (High Speed Downlink Packet Access) service, Max HS-SCCH power indicates power assigned to a high speed shared control channel (HS-SCCH), N indicates a total number of codes used for the HS-PDSCH, and $Power_{cpich}$ indicates power assigned to a common pilot channel (CPICH).

13. The method of claim 11, wherein the SRNC transmits the power offset information when a radio bearer to the UE is set up.

14. A method for transmitting power offset information on a high speed physical downlink shared channel in a Node B to achieve excellent channel performance indication between a user equipment (UE) located in a cell and the Node B, in a system including the Node B a drift radio network controller (DRNC) connected to the Node B, for managing resource information for communication with UEs located within the cell occupied by the Node B, and a serving radio network controller (SRNC) connected to the DRNC for transmitting a control message to the UEs, the method comprising the steps of:
  sending a radio link reconfiguration prepare message from the SRNC to the, DRNC;
  transmitting a physical shared channel reconfiguration request message including total power assigned for an HSDPA (High Speed Downlink Packet Access) service, from the DRNC to the Node B;
  transmitting a response message for the physical shared channel reconfiguration request message, from the Node B to the DRNC;
  transmitting a radio link reconfiguration prepare message including HSDPA service-related information, from the DRNC to the Node B;
  determining, by the Node B, the power offset information considering the total power assigned for the HSDPA service, and transmitting a response message for the radio link reconfiguration prepare message along with the power offset information, to the DRNC;
  transmitting a radio link reconfiguration prepare message including the power offset information, from the DRNC to the SRNC; and
  transmitting a radio bearer reconfiguration request message including the power offset information, from the SRNC to the UE.

15. The method of claim 14, further comprising the steps of:
  upon receiving the radio link reconfiguration prepare message, transmitting by the SRNC a radio link reconfiguration commit message to the DRNC; and
  transmitting by the DRNC a radio link reconfiguration commit message to the Node B in response to the radio link reconfiguration commit message received from the SRNC.

16. The method of claim 14, wherein the power offset information $PO_{hsdsch}$ is determined by $$Power_{hsdsch} = (\text{Max HSDPA Total power} - \text{Max HS-SCCH power} - \text{margin})/N \quad PO_{hsdsch} = 10 \log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for the HSDPA (High Speed Downlink Packet Access) service, Max HS-SCCH power indicates power assigned to a high speed shared control channel (HS-SCCH), N indicates the total number of codes used for the HS-PDSCH, and $Power_{cpich}$ indicates power assigned to a common pilot channel (CPICH).

17. A method for transmitting power offset information on a high speed physical downlink shared channel in a drift radio network controller (DRNC) to achieve excellent channel performance indication between a user equipment (UE) located in a cell and a Node B, in a system including the Node B, the DRNC connected to the Node B for managing resource information for communication with UEs located within the cell occupied by the Node B, and a serving radio network controller (SRNC) connected to the DRNC for transmitting a control message to the UEs, the method comprising the steps of:
  determining the power offset information considering a ratio of power assigned to a common pilot channel to power assigned to the high speed physical downlink shared channel;
  transmitting an NBAP (Node B Application Part) message including the power offset information to the Node B; and
  transmitting an RNSAP (Radio Network System Application Part) message including the power offset information to the SRNC;
  wherein the SRNC transmits an RRC (Radio Resource Control) message including the power offset information to the UE.

18. The method of claim 17, wherein the power offset information $PO_{hsdsch}$ is determined by $$Power_{hsdsch} = (\text{Max HSDPA Total power} - \text{Max HS-SCCH power} - \text{margin})/N \quad PO_{hsdsch} = 10 \log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for the HSDPA (High Speed Downlink Packet Access) service, Max HS-SCCH power indicates power assigned to a high speed shared control channel (HS-SCCH), N indicates a total number of codes used for the HS-PDSCH, and $Power_{cpich}$ indicates power assigned to the common pilot channel (CPICH).

19. A method for transmitting power offset information on a high speed physical downlink shared channel in a Node B to achieve excellent channel performance indication between a user equipment (UE) located in a cell and the Node B, in a system including the Node B, a drift radio network controller (DRNC) connected to the Node B for managing resource information for communication with UEs located within the cell occupied by the Node B, and a serving radio network controller (SRNC) connected to the DRNC for transmitting a control message to the UEs, the method comprising the steps of:

receiving information on a total power assigned for an HSDPA (High Speed Downlink Packet Access) service from the DRNC through an NBAP (Node B Application Part) message;

determining the power offset information considering a ratio of power assigned to the high speed physical downlink shared channel, determined based on the information on the total power assigned for the HSDPA service, to power assigned to a common pilot channel; and transmitting an NBAP message including the power offset information to the DRNC;

wherein the DRNC transmits an RNSAP (Radio Network System Application Part) message including the power offset information to the SRNC, and the SRNC transmits an RRC (Radio Resource Control) message including the power offset information to the UE.

20. The method of claim 19, wherein the power offset information $PO_{hsdsch}$ is determined by $$Power_{hsdsch} = (\text{Max HSDPA Total power} - \text{Max HS-SCCH power} - \text{margin})/N$$
$$PO_{hsdsch} = 10 \log_{10}(Power_{hsdsch}/Power_{cpich})$$

where, $Power_{hsdsch}$ indicates power per code for the high speed physical downlink shared channel (HS-PDSCH), Max HSDPA Total power indicates the total power assigned for the HSDPA (High Speed Downlink Packet Access) service, Max HS-SCCH power indicates power assigned to a high speed shared control channel (HS-SCCH), N indicates a total number of codes used for the HS-PDSCH, and $Power_{cpich}$ indicates the power assigned to the common pilot channel (CPICH).

* * * * *